Figure 5:
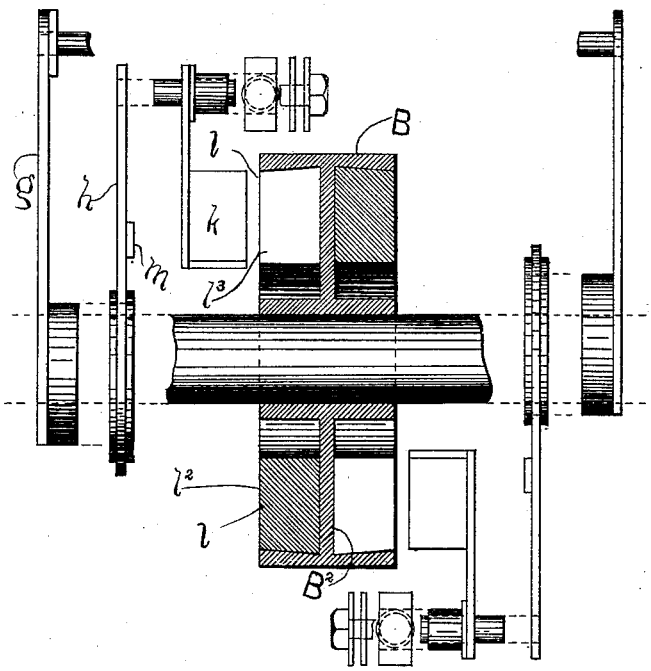

(No Model.) 8 Sheets—Sheet 1.
W. H. KNIGHT.
TRANSMITTING GEAR FOR ELECTRIC MOTORS.
No. 358,043. Patented Feb. 22, 1887.
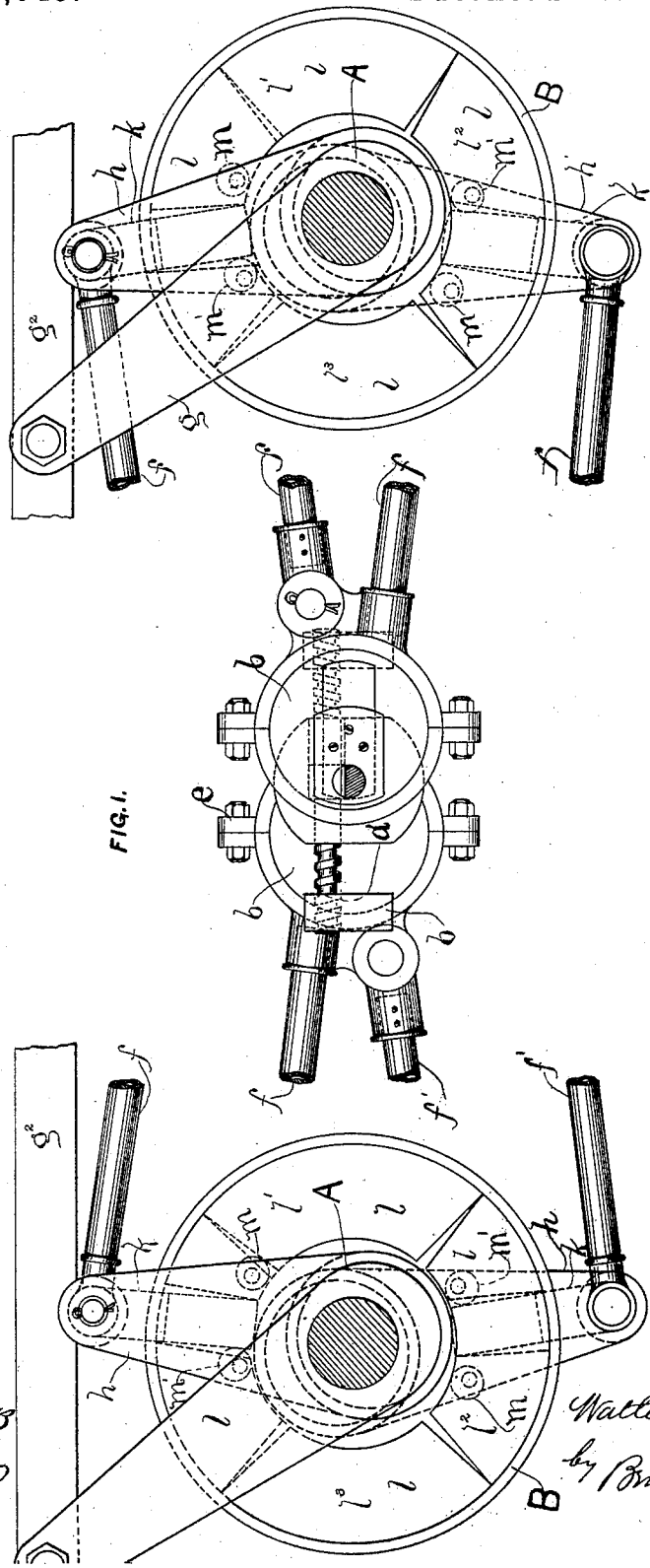
WITNESSES
F. A. Hopkins
H. S. Knight
INVENTOR
Walter H. Knight
by Bailey & Knight
Attys.
N. PETERS, Photo-Lithographer, Washington, D. C.

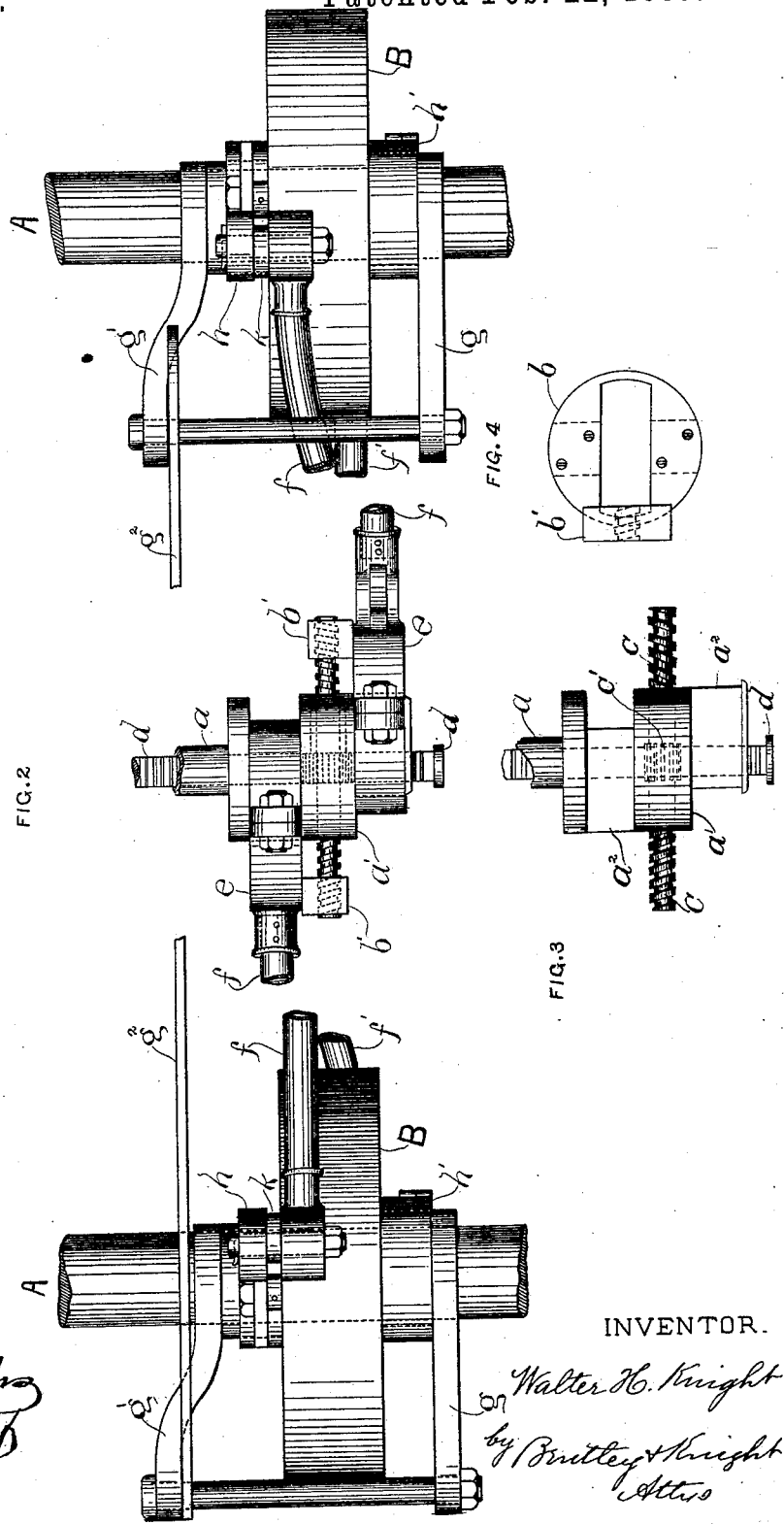

(No Model.)
8 Sheets—Sheet 3.

W. H. KNIGHT.
TRANSMITTING GEAR FOR ELECTRIC MOTORS.

No. 358,043. Patented Feb. 22, 1887.

(No Model.) 8 Sheets—Sheet 4.
W. H. KNIGHT.
TRANSMITTING GEAR FOR ELECTRIC MOTORS.
No. 358,043. Patented Feb. 22, 1887.

WITNESSES
INVENTOR
Walter H. Knight (No Model.) 8 Sheets—Sheet 5.
W. H. KNIGHT.
TRANSMITTING GEAR FOR ELECTRIC MOTORS.
No. 358,043. Patented Feb. 22, 1887.
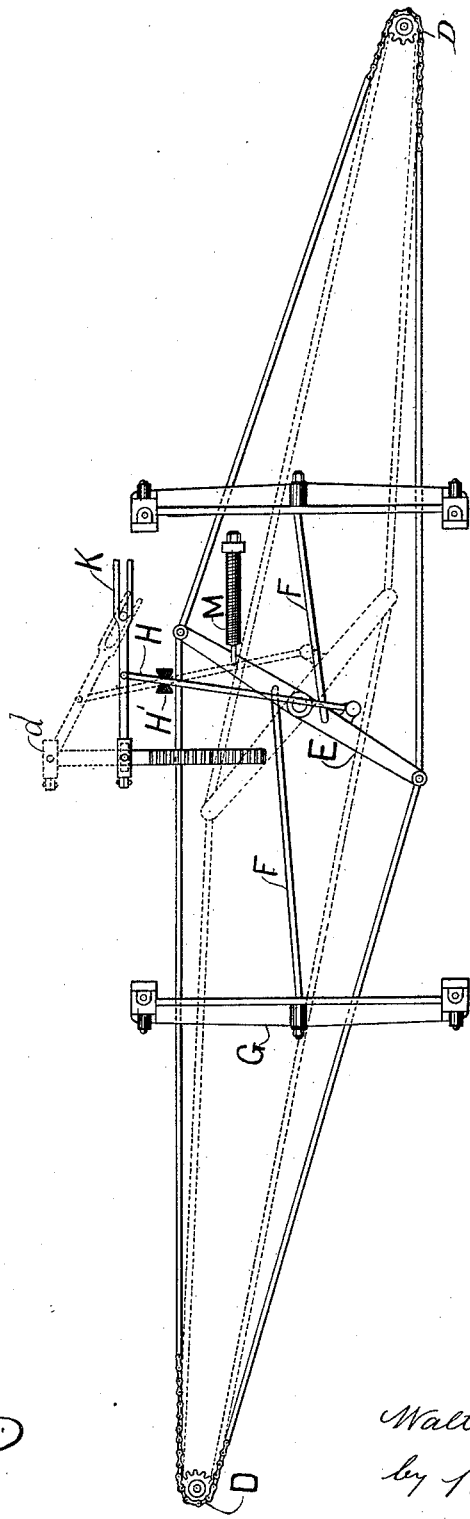
WITNESSES
INVENTOR
Walter H. Knight
by Bradley & Knight
Attys.

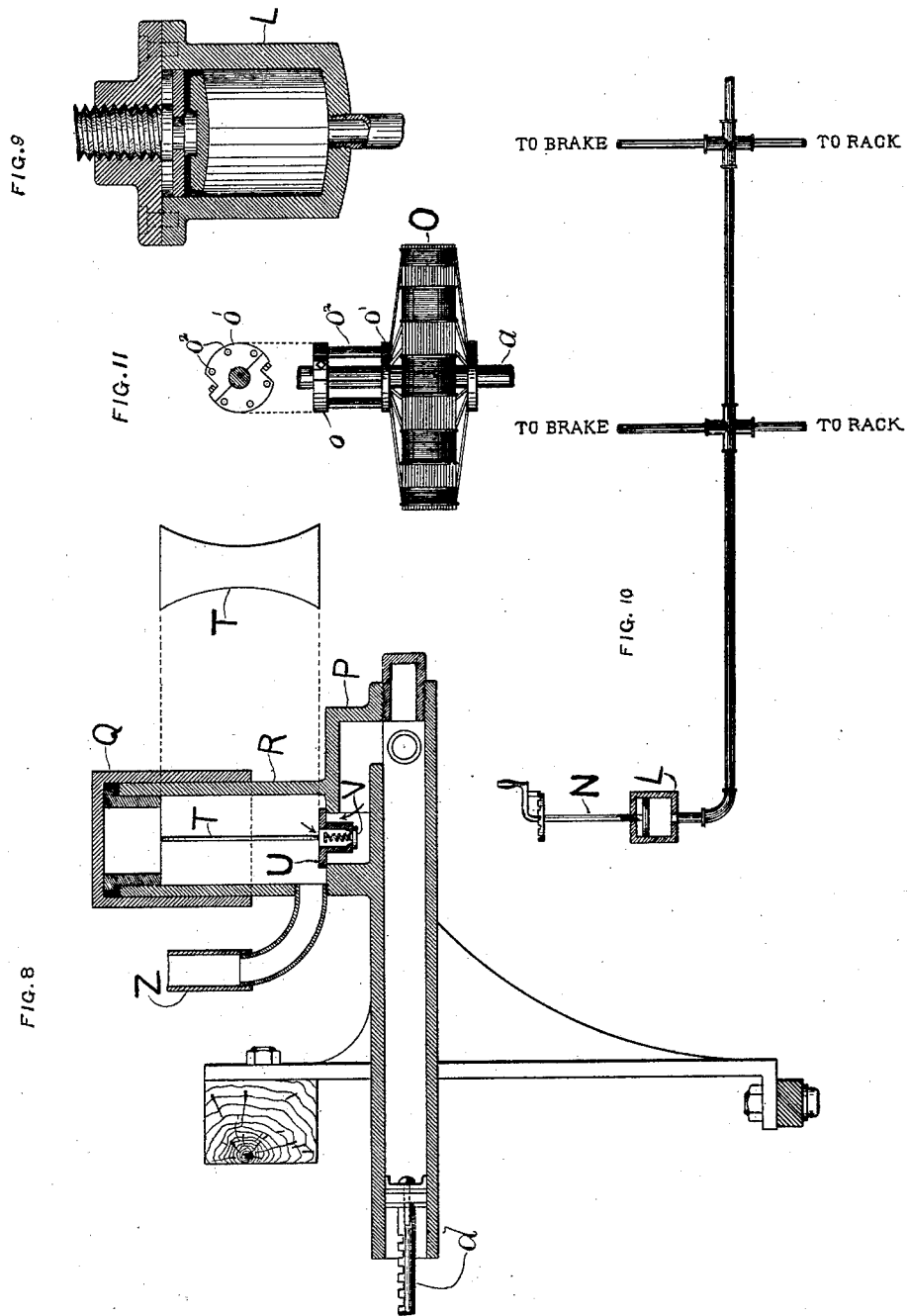

(No Model.) 8 Sheets—Sheet 7.
W. H. KNIGHT.
TRANSMITTING GEAR FOR ELECTRIC MOTORS.
No. 358,043. Patented Feb. 22, 1887.
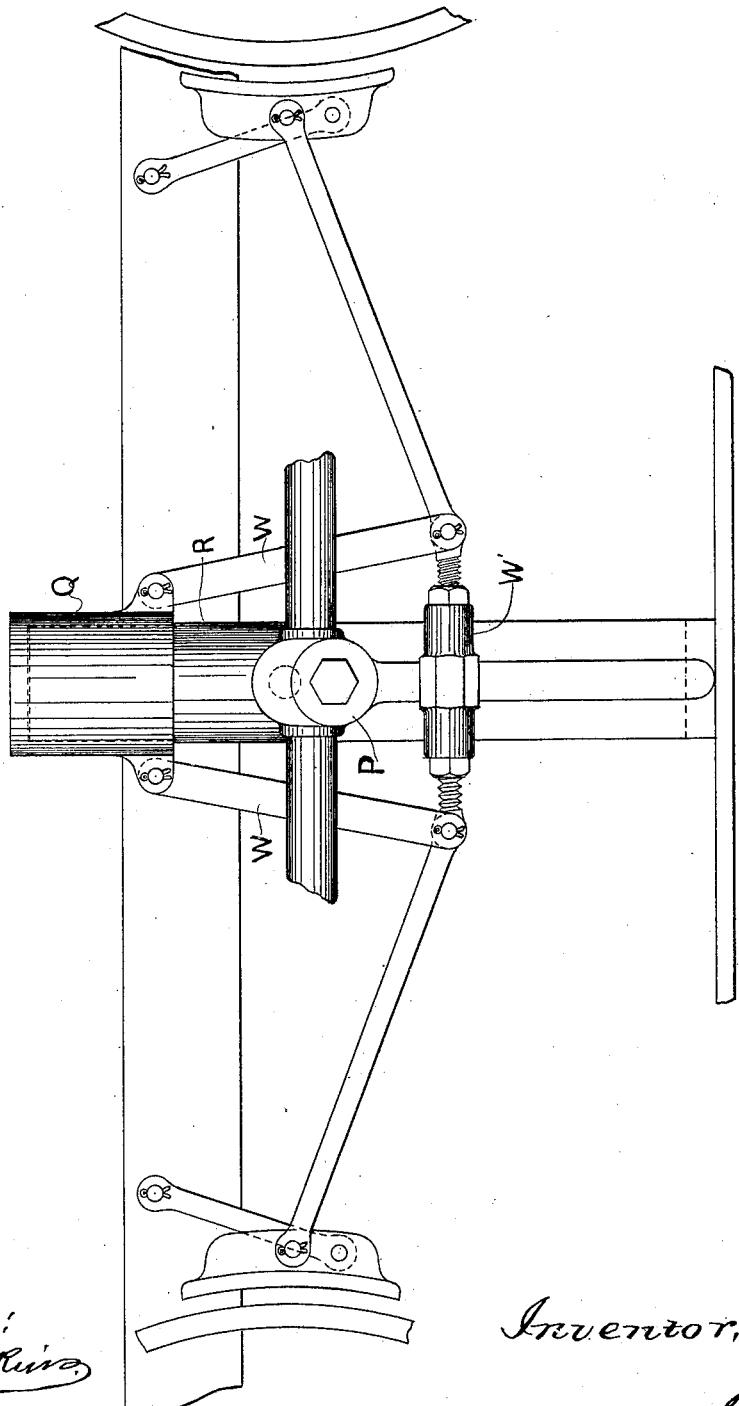

(No Model.)  8 Sheets—Sheet 8.

W. H. KNIGHT.
TRANSMITTING GEAR FOR ELECTRIC MOTORS.

No. 358,043. Patented Feb. 22, 1887.

WITNESSES  INVENTOR

UNITED STATES PATENT OFFICE.

WALTER H. KNIGHT, OF NEW YORK, N. Y.

TRANSMITTING-GEAR FOR ELECTRIC MOTORS.

SPECIFICATION forming part of Letters Patent No. 358,043, dated February 22, 1887.

Application filed April 7, 1886. Serial No. 198,128. (No model.)

*To all whom it may concern:*

Be it known that I, WALTER H. KNIGHT, a citizen of the United States, and a resident of New York city, New York, have invented certain new and useful Improvements in Transmitting-Gear for Electric Motors, of which the following is a specification.

My invention relates to means for connecting mechanically an electric motor to its load, and is especially adapted to motors on a constant potential circuit that are required to operate mechanism at a variable speed.

It consists of devices whereby the ratio between the rates of rotation of the motor and its load may be varied at will from zero to a maximum without interrupting the connection between them or the operation of the motor.

The leading features of this gear are, first, that it is positive—that is, that through it the motor acts upon its load without possibility of slippage, such as is liable to take place with friction gears and belts, and any motion of the motor is necessarily followed by movement of the load; second, that it is variable—that is, it can be changed gradually and without interrupting its operation, so that the ratio between the speed of the motor and that of its load can be whatever the operator may desire, this variation taking place between positively-operating parts, and having such a range that the speed of the load or driven mechanism may be increased from zero to a maximum, while that of the motor remains nearly constant.

I am aware that various attempts have been made to secure a changeable gear for motors on a constant potential circuit. Distinct sets of spur-gearing with a clutch for throwing either set into operation have been proposed. It has also been suggested that conical pulleys with belts or friction-wheels be employed, and adjustable reciprocating gear is also not new; but none of these have the qualities of positiveness and variability while in operation to the extreme degree by which my invention is characterized.

More specifically, my invention consists in a reciprocating device to which motion is imparted by the motor, and which imparts motion to the driven mechanism by a step-by-step action. This transmitter is made variable by having two parts, one of which is constantly actuated by the motor, and the other is movable relatively thereto from a position of dead-center, so as to have a variable throw imparted to it.

My invention also consists in various details of construction, and especially in certain features adapting it for railway service. It is illustrated in the accompanying drawings, wherein—

Figure 6:
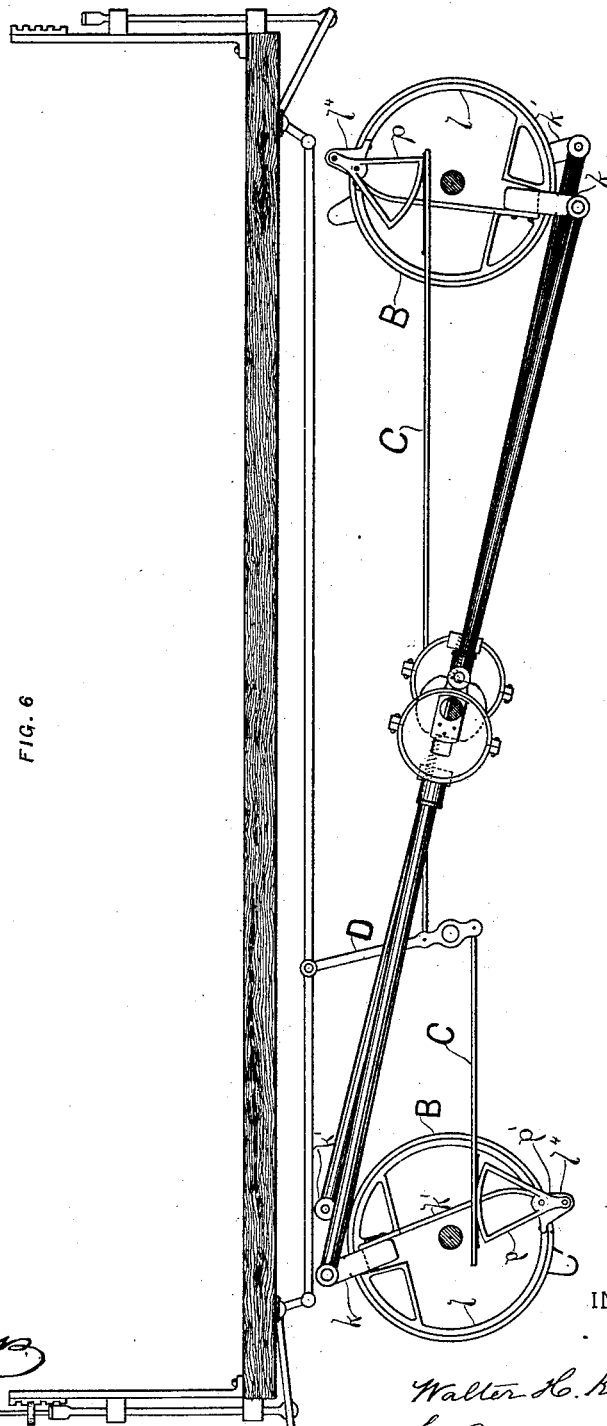
Figure 13:
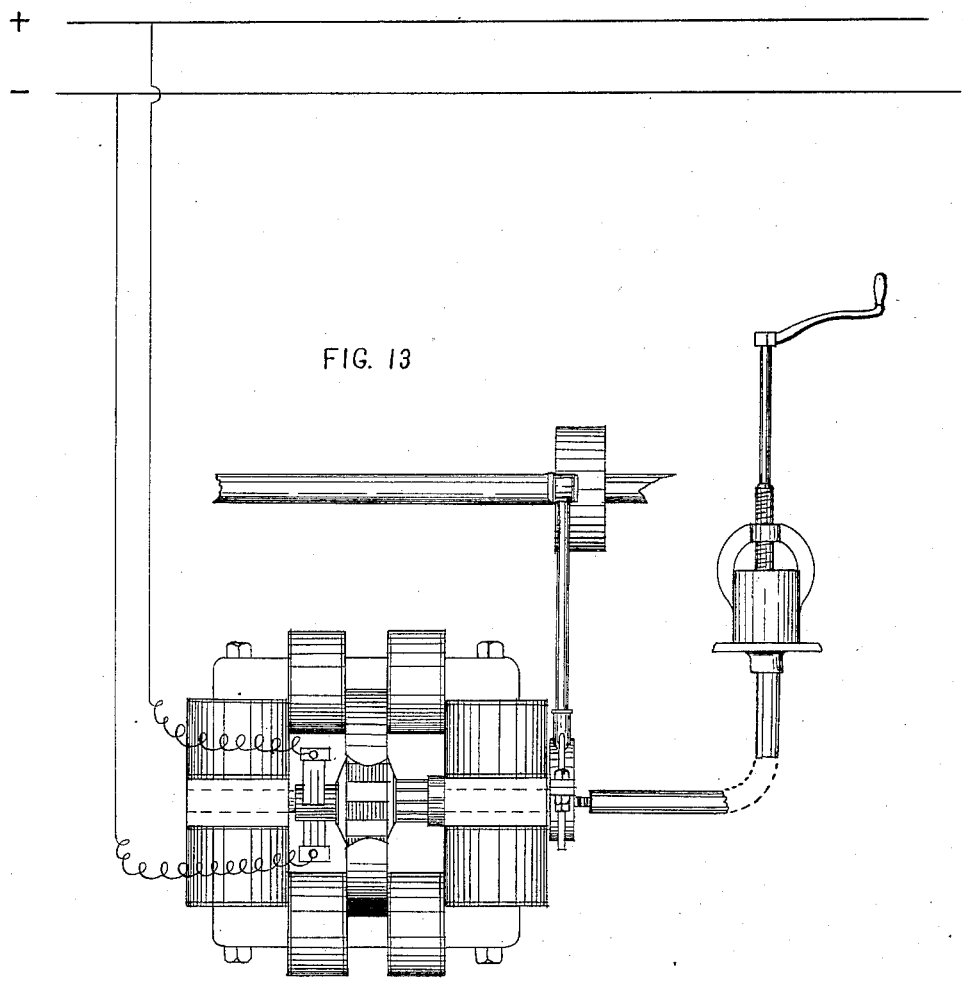

Figure 1 is a side elevation of the device applied to a railway-vehicle, the axles being in section and only the operating parts being shown. Fig. 2 is a plan view of the same. Fig. 3 is a view of the crank without eccentrics. Fig. 4 shows one of the eccentrics. Fig. 5 shows the parts of the clutch in detail. Fig. 6 is a modified form of clutch. Fig. 7 shows a mechanical controller. Figs. 8, 9, and 10 show a hydraulic controller. Fig. 11 shows a spring connection between the armature and its shaft. Fig. 12 shows the hydraulic brake. Fig. 13 shows the electric motor connected to an ordinary multiple-arc circuit or other circuit of a substantially definite potential with a variable clutch-gear connecting it with its driven mechanism.

In Figs. 1 and 2, A A are the two axles of a vehicle to be propelled by an electric motor, and $a$ is the shaft of a rotary electric motor placed midway between them. The motion of the motor-shaft $a$ is imparted to the axles A A by means of my new transmitting-gear, which consists of reciprocating clutches on the axles with connecting-rods extending to a variable crank or eccentric on the shaft.

In Fig. 3 it will be seen that shaft $a$ terminates in two rectangular cranks, $a^2$, extending from the shaft in diametrically-opposite directions. $b\ b$ are two disks, having rectangular openings fitting over $a^2\ a^2$, upon which, as bearings, they are free to slide laterally and oppositely. They can thus be moved from their normal position concentric with shaft $a$ to a position eccentric thereto, as is shown in Figs. 1 and 2. The disks $b\ b$ are embraced by straps $e\ e$, from each of which extend two connecting-rods, $f\ f'$, leading to the clutches, which will be described hereinafter.

It will be readily perceived that when $b\ b$ are concentric with the shaft no motion whatever will be imparted to the straps and connecting-rods, but that as b b are moved outward on their bearings $a^2$ $a^2$ a reciprocating combined with a rotary motion will be given to the straps, which becomes practically a simple reciprocating motion at the clutches, the amplitude of this motion being determined by the degree of eccentricity of the disks.

The degree of eccentricity is completely under the control of the operator of the machine, being variable at will from zero to a maximum without interfering with the continuity of action of the mechanism, so that the motor may run free or exert a greater or less leverage upon its load, with a consequent and corresponding variation in the speed at which the load moves. This is accomplished by the following means: Upon each disk $b$ is a lug, $b'$, projecting from its periphery in a direction at right angles to the plane of the disk, the lug upon one disk extending inward and that on the other disk extending outward, so that they both come into a common plane at right angles to the axis of the shaft. These lugs form nuts, in which work the opposite ends of right and left handed screw $c$, which has a bearing in the circular head $a'$, between the two cranks $a^2$ $a^2$. In the center of screw $c$ is a pinion, $c'$, which engages with a rack, $d$, adapted to move axially in shaft $a$, which is hollowed out to receive it. By the movement of this rack longitudinally both disks may be thrown out simultaneously and equally and the action of the motor be gradually imparted to the transmitter and its load.

The manner of actuating the rack will be described hereinafter, attention being next called to the clutch.

Upon each axle is securely fastened a clutch-cylinder, B. Shown in elevation in Fig. 1, in plan in Fig. 2, and in section in Fig. 5.) This cylinder is hollow, and is divided into two parts by partition $B^2$, so that one cylinder serves for two clutches, one upon each side. There will therefore be four clutches, two acting upon each axle, and connected, respectively, with the rods $f f'$, extending in opposite directions from the motor. As the clutches are all alike a description of one will serve for all. Fitting the interior of the cylinder is a gripping-ring, $l$, which, in the form shown in Fig. 1, is constructed in three annular segments, $l'$, $l^2$, and $l^3$, and has an opening left in its circumference between segments $l^3$ and $l'$, in which is inserted a binding-cam or dog, $k$. This cam $k$ has an upright arm, to the end of which is journaled the end of connecting-rod $f$, and its function is, when turned by the pull of the rod upon the arm, to spread or distend the gripping-ring until it presses so tightly upon the clutch-cylinder that any further movement of the cam carries the cylinder with it and rotates the axle. In Fig. 1 the cam is shown in dotted lines in its binding position, the amount of its "play" between segments $l^3$ and $l'$ being greatly exaggerated; in fact, it fits quite closely and has its corners slightly rounded.

It is apparent from the description thus far given that the cam will bind upon the movement of the rod $f$ in either direction, while it is essential to its operation that it should move freely in one direction, carrying the gripping-ring with it. The direction of movement of the vehicle will obviously depend upon the direction in which the cam binds and in which it moves freely, so that this should be determinable at will, for the purpose of reversing the vehicle when desired. The manner of accomplishing this will be understood from a further consideration of the drawings.

Cam $k$ is supported at its pivotal point by an arm, $h$, which has a bearing upon a similar arm, $g$, the arm $g$ having in turn a bearing on the axle. Upon the inner side of $h$ are fixed two stops, $m$ and $m'$, one upon each side of cam $k$. Arm $h$ in its bearing on $g$ is concentric thereto; but $g$ in its bearing on the axle is eccentric thereto. If, therefore, the outer end of $g$ be thrown over in one direction the inner end of $h$ will be thrown in the opposite direction, carrying stops $m$ and $m'$ with it. By this means either $m$ or $m'$ will be moved over laterally until it comes against the lower end of cam $k$, the effect of which will be understood by an inspection of Fig. 1, taking, for example, the upper right-hand clutch. When in that clutch the connecting-rod $f$ tends to move from right to left, pulling on arm $h$ and the outer end of cam $k$. The body of the cam, being free to move relatively to $h$, will tend to lag behind, and its opposite corners, binding against segments $l^3$ and $l'$, will distend the gripping-ring, as described before, and turn the clutch-cylinder and axle A. When, however, it has completed its stroke and starts to return from left to right, the stop $m'$, which may be called the releasing-stop, and which, it is to be borne in mind, is carried by supporting-arm $h$, comes against the lower end of $k$ and prevents its lagging behind the supporting-arm so as to bind in the segments. The cam has instead a flat square bearing against segment $l'$ and turns the gripping-ring loosely around in the cylinder.

It will be seen that a rapid repetition of this action gives a series of impulses to the axles, which, by the momentum of the load, are converted into a practically continuous rotation. The two clutches on each axle act alternately so that while one is pulling the other one is going free. They are also upon opposite sides of the axle, one above and the other below, by means of which I preserve a balanced side pressure on the motor-shaft, for the diagonally-opposite clutches will be pushing or pulling simultaneously, so that they mutually counteract each other's reaction on the shaft—a feature of great importance in a rapidly-moving mechanism.

It will be readily seen that the movement of the connecting-rods imparted thereto by the crank (the eccentric being considered as a crank with a wrist-pin larger in diameter than the shaft) is a harmonic movement— that is, with each stroke it starts from a state of rest and gradually increases in speed to a maximum, and thence again decreases in speed to a state of rest. The rate of speed of any point in the connecting-rod in a horizontal direction would be represented graphically by a regular undulatory curve, (this at least is the tendency,) while, on the other hand, the rate of speed of the axle for a given load and a given throw of the driving-eccentrics should be constant and capable of representation by a straight line. Suppose, then, the transmitting mechanism to be rigid, and for a constant armature-speed the clutch would act upon the axle for only an instant in each double stroke. The undulatory curve representing the clutch-speed would meet the straight line representing the axle-speed at a series of maximum points only. The result would be that unless a large number of clutches were used, acting successively on the axle, a series of impulses would be imparted by the clutch so sudden as to be almost blows, and undue wear of the parts would ensue, as well as a disagreeable pounding uncomfortable for travelers on the vehicle, while in starting a load up a hill the momentum due to one impulse would not be sufficient to maintain the motion till the next impulse. I surmount the difficulty here involved by placing at some point in the train of mechanism between the armature and its load an elastic medium, through which the transmitter must act. This modifies to a large degree the harmonic tendency of the reciprocating parts, and distributes the action of each clutch upon the axle over a larger part of its stroke. I have found this elasticity to be best attained by introducing a spring between the armature and its shaft. The kind of spring best adapted for this purpose is illustrated in Fig. 11. O represents the armature, its hub $o$ being loose on the shaft. $o'$ is a disk, made in halves and clamped tightly to the shaft, and between it and hub $o$ is a series of steel spring-rods, $o^2$. The disk being fast on the shaft and the armature and hub being loose, a slight spring of the armature relatively to the shaft is easily obtained.

I have now fully explained my transmitting-gear, though a modified but very desirable form of it, as well as the controlling mechanism, remains to be explained; and I will say here that, for the purpose of more clearly defining the invention, I consider the transmitting-gear to be in two parts, one of which is continuously operated by the motor, while the other part is movable relatively to the first from a position of dead-center, where it receives no motion therefrom, to an eccentric position, where it receives therefrom a motion greater or less, as the operator may desire. In the form described the first part is the cranks $a^2$, which are driven constantly by the shaft $a$, and the second part includes the disks $b$, the clutches, and intermediate connections. The disks $b$, it is true, are constantly rotated by the cranks; but in reciprocating movement, which alone is essential to the operation of the clutches and axle, the disks partake of the nature of the second part of the gear, and should be considered as belonging to it.

I do not intend to limit myself to the variable eccentric herein shown, since other well-known mechanical substitutes therefor may be employed.

The modified form of clutch is shown in Fig. 6. In this form the three-part gripping-ring is replaced by a light hoop of steel or brass, the ends having a slight tendency to spring in against cam $k$. The cam has a spring-extension, $k'$, which constantly presses the cam over into a binding position, and has a bearing upon the diametrically-opposite point of the ring. By moving the end of this spring from one side to the other the action of the clutch will be reversed. This is accomplished in the following manner: The end of the spring is pivoted at point $p'$ on segment $p$, which in turn is pivoted to lug $l'$, fastened to the ring $l$. On the periphery of segments $p$ rests a rod, C, having two straps attached to it, which are connected, respectively, to opposite ends of the arc of the segment. The rods C from opposite clutches are drawn in contrary directions by intermediate lever, D, which is worked from opposite ends of the vehicle. The connecting-rods in this form of clutch are connected to opposite sides of the same eccentric-strap, so that they may work directly upon the cams without an offset, such as is necessary when from the same eccentric-rods extend two clutches upon opposite sides of cylinder B. When this arrangement of rods is adopted it is necessary, in order to secure the balanced strain, to have the two clutches on one axle both below and those on the other axle both above. The ring $l$ is circumferentially adjustable.

In controlling this gear connected with motors on a constant potential circuit is involved all the control necessary for the complete working of the motor. It is wholly mechanical, there being no artificial resistances or circuit-breakers necessary. The motor runs constantly in a constant direction, so that the lead of the brushes may be constant also, both in direction and degree. A simple series-wound motor is all that is required, and the central-station regulation is much simplified.

I have found it desirable that the brake mechanism for the vehicle and the rack controlling the gear should both be capable of operation by the same device, so that one controlling lever or wheel is all that is necessary for the management of a car in addition to the reversing mechanism, which will only be operated at comparatively long intervals. In stopping the car the rack and brake should be worked successively, while in starting the reverse order should be followed, in order that the brakes shall never be set while the motor is acting on the axles.

In Fig. 7 a mechanical arrangement for working the brake and rack is shown. D is a sprocket-wheel on the ordinary brake-spindle of a street-car, by means of which the ordinary brake apparatus can be worked positively in both directions. This consists, as usual, of a lever, E, pivoted centrally beneath the car and connected at each end to draw-rods extending to join the sprocket-chain working on wheel D. From opposite sides of the center of E rods F extend to brake-beams G. This is the common brake mechanism in use on street-cars. In addition I provide a lever, K, which has at one end a slotted pivotal bearing and at the other a swiveled journal-box inclosing the rotating head of rack d. A connecting-rod, H, joins levers E and K, and is so held by guides H' that it both slides and turns upon them. This permits the end of K which carries the end of rack d to move in a straight line. The two extreme positions of the apparatus are shown by the full and dotted lines, respectively, the former showing the normal position with the rack clear in, where it is held by the spring M. It will thus be necessary in starting the car to turn the spindle against the pull of M, and in stopping to simply let go of the handle, when the spring will throw in the rack and bring the brake-shoes close to the wheel, where they may be set by a further turn of the spindle given by hand. The rack is therefore always in before the brakes are set, and the brakes are always released before the rack is drawn out.

Figs. 8, 9, 10, and 12 show a device for working the brake and the rack hydraulically. A compression-cylinder containing oil or other fluid is controlled by the operator, and from thence a pipe leads to a second cylinder, where, by means of a piston, the pressure is transmitted to the rack and brake. Air of course may be substituted for the oil.

L, Figs. 9 and 10, is a cylinder, in which moves a piston by means of a screw on the lower end of the ordinary brake-spindle N. This spindle is intended to be operated as in the mechanical brake. The spring M is in this case wound around the shank of the spindle. The handle at the top is loose on the spindle, but has a projection which is normally held by the weight of the handle in engagement with the teeth of a crown-wheel fastened to the spindle, so that to stop the vehicle the handle is lifted and the spindle allowed to turn under the force of spring M till the rack is forced in and the brakes are in position to be set. From compression-cylinder L a pipe leads to cylinder P, in which the head of rack d works as a piston. d is drawn into the cylinder by air-pressure, and is forced out by hydraulic pressure. When d is forced completely out of the cylinder and into the hollow motor-shaft, the oil is then forced up through valve U into cylinder R against the force of plate-spring T. The pressure coming longitudinally on the end of the spring, its initial resistance will be considerable; but when once bent it will be comparatively flexible.

Outside of R is movable cylinder Q, which is connected with the brake mechanism, as shown in Fig. 12, which is a well-known toggle-movement, adjustable by means of turnbuckle W' between the lower ends of rods W. Pipe Z leads to a similar arrangement upon the other side of the vehicle. When the oil-pressure is released the weight of the brake-shoes and the air-pressure combined expels the oil from R through valve V and releases the brakes before the rack is drawn in.

Fig. 10 shows the system in diagram, and also shows more than one controlling mechanism on the same system of piping. When two or more motors are used on the same car or train, it will be of great service to have their transmitting-gear controlled from a common point.

In all forms of controlling mechanism the gear will be in action while the said mechanism will be practically stationary. When a single car is used, as in tramway service, a compressing-cylinder, L, will be placed on each end of the car, so that it can travel in each direction without turning around. The reversing mechanism is so shown in Fig. 6. In the first-described clutch all the reversing arms g extend vertically from the axle, and are connected by a common rod, $g^2$, which is controlled from either platform, as is shown in Fig. 6.

The motor and the gear will all be inclosed in a well-known manner, so as to be protected from dirt and weather.

I claim—

1. The combination of an electric motor on a constant potential circuit and driven mechanism with a positive variable transmitting-gear, substantially as described, and a relatively stationary manual actuating device for said gear, whereby the gear may be varied at will and electrical controlling devices dispensed with.

2. The combination of an electric motor and driven mechanism with a positive reciprocating transmitting-gear connecting the same and means for manually varying the gear while running, so as to alter the ratio of speed between the motor and mechanism.

3. The combination of an electric motor, reciprocating mechanism actuated thereby, means for manually varying the speed of said mechanism while in motion, and driven mechanism operated step by step by said reciprocating mechanism.

4. The combination of an electric motor on a circuit of substantially constant potential, a positive transmitting-gear consisting of two parts, one operated continuously by the motor, the other having a sliding movement upon the first part and connected to the driven mechanism, and means connected to the transmitting-gear for manually moving the two sliding parts upon each other while in action, so as to vary the rate of gear between the motor and driven mechanism, whereby electrical controlling devices are dispensed with.

5. The combination of an electric motor on a circuit of substantially constant potential, and mechanism driven thereby with an intermediate gear consisting of two parts, the first part receiving a continuous motion from the motor and the second part connecting with the driven mechanism and movable upon the first part to a position of dead-center relatively thereto, so as to receive no operative motion therefrom, whereby electrical controlling devices are dispensed with.

6. The combination, with an electric motor and mechanism driven thereby, of two variable reciprocating transmitters and a common mechanical actuating device for varying the same simultaneously, whereby a continuous motion is imparted to the said mechanism and electrical controlling devices dispensed with.

7. The combination, with an electric motor and a vehicle propelled thereby, of two variable step-by-step transmitters driven by the motor and acting on the axles of the vehicle, with means for simultaneously varying the said transmitters, extending to an accessible part of the vehicle, so as to be controlled by the operator.

8. The combination, with an electric motor on a constant potential circuit, of a vehicle propelled thereby, a variable reciprocating transmitting-gear between the motor and the axle of the vehicle, and a mechanical controlling device for said locomotive, consisting of means for varying the said gear, adapted to be operated at the will of the operator.

9. The combination, with a vehicle having two sets of axles and an intermediate propelling electric motor, of reciprocating transmitting-gears, one between the propelling motor and each axle, adapted to work simultaneously in opposite directions, so as to prevent side strain or jar.

10. The combination of an electric motor and its driven mechanism with a reciprocating transmitter having a motion with a harmonic tendency imparted to it by the motor and acting step by step on the mechanism to impart a substantially constant rate of speed thereto, and of an elastic compensating medium for modifying the harmonic tendency, substantially as described.

11. The combination of an electric motor and its driven mechanism with a positive variable transmitting-gear, substantially as described, having an elastic medium, through which the motion of the motor is transmitted to the mechanism.

12. The combination of an electric motor on a constant potential circuit having a constant direction of lead of its brushes, and having in its circuit substantially its own resistance only, and a reversible and gradually-variable gear-connection between it and its driven mechanism, with means for varying said gear while in operation, constituting the main controlling device for the mechanism, whereby artificial resistance or other electrical controlling device is dispensed with.

13. The combination, with an electric motor and a positive variable reciprocating transmitting-gear, substantially as described, of a reversible clutch connecting said gear with the driven mechanism and a reversing device therefor leading to a stationary point, so as to be operated at will.

14. The combination, with an electric motor and driven mechanism, of an intermediate positive variable reciprocating transmitting-gear and a stationary manual actuating or controlling device therefor, whereby the gear may be varied while in operation.

15. The combination of an electric motor, a vehicle propelled thereby, a positive variable transmitting-gear, substantially as described, and substantially stationary means for actuating or controlling said gear at will placed on the vehicle at the point from which it is regulated.

16. The combination, with an electric motor and mechanism driven thereby, of two or more reversible reciprocating clutches acting on said mechanism and a common reversing device therefor.

17. The combination, with an electric motor and mechanism driven thereby, of two or more reversible reciprocating clutches, mechanism with each clutch for determining the binding direction thereof, and a common actuating device for said mechanisms, whereby the clutches may be all reversed simultaneously.

18. The combination, with an electric motor having a constant direction of lead of its brushes and mechanism operated thereby, of two or more intermediate reversible clutches, substantially as described, and means for simultaneously reversing the said clutches at will.

19. The combination, with an electric motor having a constant direction of lead of its brushes, of a vehicle propelled thereby, two or more reversible reciprocating clutches between the motor and the axle of the vehicle, mechanism for reversing each clutch, and a common actuating device connected with all of said reversing mechanisms and extending to an accessible part of said vehicle.

20. The combination, with an electric motor and a vehicle propelled thereby, of a reversible reciprocating clutch driven by the motor and acting upon the axle of said vehicle, with reversing mechanism for said clutch, and an actuating device therefor extending to an accessible part of said vehicle.

21. The combination, with an electric motor and a vehicle propelled thereby, of a reversible reciprocating clutch driven by the motor and acting upon the axle of said vehicle, with reversing mechanism for the clutch, and an actuating device therefor extending to each end of the said vehicle.

22. The combination, with an electric motor and a vehicle propelled thereby, of a gradually-variable gear connecting the motor and the axle of said vehicle, with mechanism for varying said gear, and an actuating device therefor extending to both ends of said vehicle.

23. The combination, with a vehicle and an inclosed propelling electric motor therefor, of a gradually-variable gear connecting the motor and the axle of the vehicle, mechanism for varying said gear at will, and an actuating device for said mechanism extending to one end of the vehicle.

24. The combination, with a clutch-cylinder and gripping-ring, of a binding-cam working at one point in the circumference of the ring, with a spring-bearing at substantially diametrically-opposite points.

25. The combination, with a clutch-cylinder and gripping-ring, of a binding-cam for said ring having a bearing thereon.

26. The combination, with a clutch-cylinder and gripping-ring, of a binding-cam in the circumference of said ring and a laterally-movable releasing-stop therefor, whereby the direction of binding of said cam may be reversed at will.

27. The combination, with a clutch-cylinder and a reciprocating gripping-ring circumferentially adjustable, of means of binding said ring against said cylinder.

28. The combination of a variable gear-connection between a driven shaft or axle and an actuating electric motor, a brake for said shaft, and a common actuating mechanism for both gear and brake.

29. The combination of a variable gear-connection between an electric motor and a driven shaft or axle, by which the action of the motor upon the shaft may be reduced to zero, means for varying the gear at will, and a brake for the said shaft or axle, with a common actuating device for said means and said brake differentially connected thereto, so as to act successively upon them, whereby the gear may be completely actuated before the brakes are set.

30. The combination of two or more electric motors and a common driven mechanism, a gear between each motor and the said mechanism gradually variable at will, a varying device for each gear, and a common actuating mechanism therefor, whereby the said gears may be simultaneously operated from a common point.

31. The combination, with an electric motor and a reversible reciprocating clutch driven thereby and imparting rotary motion to the driven mechanism, of a reversing device connected to the clutch at a point at or near the axle or shaft of the said mechanism and extending to a stationary actuating-point.

32. The combination of an electric motor adapted to run at a substantially constant rate of speed, mechanism driven thereby adapted to run at a variable speed, an intermediate positive variable transmitting-gear, and a manual device for controlling at will the said driven mechanism, consisting of means for varying the said transmitting-gear while in operation, whereby electrical control of the motor is avoided.

In witness whereof I have hereto set my hand this 3d day of April, 1886, in the presence of two attesting witnesses.

WALTER H. KNIGHT.

Witnesses:
OCTAVIUS KNIGHT,
F. A. HOPKINS.